US007191752B2

(12) United States Patent
Schriever et al.

(10) Patent No.: US 7,191,752 B2
(45) Date of Patent: Mar. 20, 2007

(54) ENERGY STORING STARTER ASSEMBLY

(75) Inventors: Robert W. Schriever, Wake Village, TX (US); Dennis E. Roberts, Redwater, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 7 days.

(21) Appl. No.: 10/846,224

(22) Filed: May 14, 2004

(65) Prior Publication Data

US 2005/0252477 A1 Nov. 17, 2005

(51) Int. Cl.
*F02N 3/02* (2006.01)
*F03G 1/02* (2006.01)

(52) U.S. Cl. .................................................. 123/185.3

(58) Field of Classification Search ............. 123/185.1, 123/185.2, 185.3, 185.4, 185.14, 185.15
See application file for complete search history.

(56) References Cited

U.S. PATENT DOCUMENTS 1,116,370 A 11/1914 Bendix
3,010,443 A 11/1961 Lyvers
3,306,277 A 2/1967 Gudmundsen
3,861,374 A 1/1975 Dooley et al.
4,019,490 A 4/1977 Reese
4,068,644 A 1/1978 Newport
4,157,083 A 6/1979 Smith et al.
4,291,654 A 9/1981 Obermayer
4,422,417 A 12/1983 Obermayer
4,434,756 A 3/1984 Nilsson et al.
4,492,190 A 1/1985 Greenwood et al.
4,582,030 A 4/1986 Reese
4,633,832 A 1/1987 Andreasson et al.
4,637,360 A * 1/1987 Osakabe .................. 123/185.2
4,638,775 A 1/1987 Lindstrom
4,928,643 A 5/1990 Kampichler et al.
4,970,998 A * 11/1990 Tyler ........................ 123/185.3
5,065,710 A 11/1991 Henriksson
5,159,845 A 11/1992 Wada et al.
5,163,393 A 11/1992 Naslund
5,243,939 A 9/1993 Viktorsson et al.
5,287,832 A 2/1994 Uhl
5,370,008 A 12/1994 Landolt
5,513,607 A 5/1996 Doragrip et al.
5,676,103 A 10/1997 Tsunoda et al.
5,715,783 A 2/1998 Osakabe et al.
6,182,367 B1 2/2001 Janczak
6,199,529 B1 3/2001 Kuwabara et al.
6,240,889 B1 6/2001 Kuwabara et al.
6,314,938 B1 * 11/2001 McCreery et al. ..... 123/406.56
6,363,901 B1 4/2002 Watanabe et al.

(Continued)

FOREIGN PATENT DOCUMENTS

DE 4135405 4/1993
DE 100 40 997 4/2001
JP 6-16964 5/1994

*Primary Examiner*—Hai Huynh
(74) *Attorney, Agent, or Firm*—Pearne & Gordon LLP

(57) ABSTRACT

An energy storing starter assembly comprising a pulley, a hub and a buffering component. The buffering component provides a resilient connection between the pulley and the hub, and is designed to store and transmit energy between the pulley and the hub. The ends of the buffering component are further designed to be interchangeable, such that either end of the buffering component may be received by either the hub or the pulley.

33 Claims, 5 Drawing Sheets

U.S. PATENT DOCUMENTS

| | | | | |
|---|---|---|---|---|
| 6,374,791 | B1 | 4/2002 | Kuwabara et al. | |
| 6,508,220 | B1 | 1/2003 | Akaike et al. | |
| 6,588,390 | B2 | 7/2003 | Kawasaki et al. | |
| 6,718,931 | B2 | 4/2004 | Morishige et al. | |
| 6,722,336 | B2 * | 4/2004 | Nieda et al. | 123/185.14 |
| 6,739,303 | B2 | 5/2004 | Harada et al. | |
| 6,755,170 | B2 | 6/2004 | Morishige et al. | |
| 6,755,710 | B2 | 6/2004 | Thai | |
| 6,776,133 | B2 | 8/2004 | Tezuka et al. | |
| 6,782,863 | B2 | 8/2004 | Leasure et al. | |
| 6,827,055 | B2 | 12/2004 | Tsunoda et al. | |
| 6,834,633 | B2 | 12/2004 | Sing et al. | |
| 6,840,207 | B2 | 1/2005 | Aiyama et al. | |
| 6,901,899 | B2 | 6/2005 | Tsunoda | |
| 6,901,900 | B2 | 6/2005 | Matsubayashi et al. | |
| 6,959,680 | B2 | 11/2005 | Hashiba | |
| 6,959,681 | B2 | 11/2005 | Saito | |
| 6,971,359 | B2 * | 12/2005 | Tohyama | 123/185.3 |
| 6,981,482 | B2 * | 1/2006 | Tsunoda et al. | 123/185.3 |
| 7,028,658 | B2 * | 4/2006 | Kruse et al. | 123/185.3 |
| 7,140,341 | B2 * | 11/2006 | Dahlberg | 123/185.3 |
| 2002/0174848 | A1 | 11/2002 | Nieda et al. | |
| 2003/0094154 | A1 | 5/2003 | Morishige et al. | |
| 2004/0079313 | A1 * | 4/2004 | Tsunoda et al. | 123/185.3 |
| 2004/0149249 | A1 * | 8/2004 | Kruse et al. | 123/185.3 |
| 2004/0250786 | A1 * | 12/2004 | Kruse et al. | 123/185.3 |
| 2004/0250787 | A1 * | 12/2004 | Tohyama | 123/185.3 |
| 2005/0051127 | A1 | 3/2005 | Adam et al. | |
| 2005/0199212 | A1 | 9/2005 | Saito | |
| 2006/0027201 | A1 * | 2/2006 | Ono | 123/179.25 |
| 2006/0070596 | A1 * | 4/2006 | Horikoshi | 123/185.3 |

* cited by examiner

ENERGY STORING STARTER ASSEMBLY

FIELD OF THE INVENTION

This invention relates generally to a recoil starter for an internal combustion engine.

More specifically, this application relates to a recoil starter for an internal combustion engine that includes an energy storing mechanism to reduce the pulling forces required to start the engine.

BACKGROUND OF THE INVENTION

Conventionally, a recoil starter is used with a manually started internal combustion engine, such as a small two-stroke engine, for example. A rope pulley is rotated by pulling an attached recoil rope that is wound onto the rope pulley, thereby transmitting a rotational force to a crankshaft of the internal combustion engine by way of a ratchet and/or clutch mechanism between the pulley and a flywheel and crankshaft. Rotation of the crankshaft drives a piston and helps provide fuel for ignition. Rotation of the flywheel causes a magneto to power a spark plug, creating a spark for ignition of the engine fuel.

In operating such a starter mechanism, abrupt changes in the engine torque due to the compression of an air/fuel mixture by the piston and the cylinder within the engine typically result in an uneven and jarring pulling force during starting, and possibly even some kickback forces. These forces can make starting the engine difficult for a user, creating stresses that can even cause an injury.

To reduce these fluctuations in pulling force, starter mechanisms have been provided which include a second rotating member, coupled to the pulley by way of a buffering component, such as a spring, wherein this second rotating member engages with the engine crankshaft, typically using a ratchet mechanism, for transmission of the rotational force. In such a solution, rotational energy stored within the buffering spring component is used to assist in transmitting a rotational force to the engine crankshaft during periods of higher required torque, thereby dampening the pulling force required by the operator and smoothing the starting operation for the user.

Despite this modification, drawbacks in the typical buffered recoil starter system remain. The added components necessary to construct such a system result in added expense of material, additional wear considerations, and more cumbersome assembly procedures. Finally, the delayed acceleration of the rotating crankshaft and flywheel can result in difficult starting when a spark is initially provided for ignition.

Needed is a way to provide a starter device that utilizes a buffering spring to enable starting the engine with a reduced pulling force, while at the same time reducing the inevitable stresses on a spring component to provide greater durability and reliability.

Additionally, it would be beneficial to provide such a buffered starter device that produces a spark properly timed with the more slowly accelerating crankshaft to ease starting. Further benefits would also be realized by incorporating additional improvements in ease of assembly and durability of the bearing surfaces, while minimizing the use of costly materials and extra components.

SUMMARY OF THE INVENTION

In accordance with one aspect of the present invention, provided is an energy storing starter assembly comprising a pulley, a hub and a buffering component. The buffering component provides a resilient connection between the pulley and the hub, and is designed to store and transmit energy between the pulley and the hub. The ends of the buffering component are further designed to be interchangeable, such that either end of the buffering component may be received by either the hub or the pulley.

In accordance with another aspect, provided is an energy storing starter assembly comprising a pulley, a hub, and a buffering component. The pulley and hub are each provided with respective inclined support surfaces. The buffering component provides a resilient connection between the pulley and the hub, and is designed to store and transmit energy between the pulley and the hub. The buffering component is provided with a first portion that mates with the support surface of the pulley, and a second portion that mates with the support surface of the hub.

In accordance with yet another aspect of the present invention, provided is an energy storing starter assembly comprising a pulley, a hub, and a buffering component. The pulley is provided with a center post and is adapted for receiving a pull rope. The hub is provided with a cage and is adapted for releasably engaging an engine. The buffering component provides a resilient connection between the pulley and the hub and is designed to store and transmit energy between the pulley and the hub. One or both of the center post and the cage are adapted for restricting the diameter of the buffering component in one direction when the buffering component is storing a substantial amount of energy, and the cage is adapted for restricting the diameter of the buffering component in another direction when the buffering component is storing a substantial amount of energy.

In accordance with still another aspect, provided is an energy storing starter assembly comprising a pulley, a hub, and a buffering component. The pulley is provided with a center post and a first inclined surface, and is adapted for receiving a pull rope. The hub is provided with a cage and a second inclined surface, and is adapted for releasably engaging an engine. The buffering component is designed to store and transmit energy between the pulley and the hub. The buffering component is provided with a first portion and a second portion, where each portion is adapted to interchangeably mate with either the first inclined surface of the pulley or the second inclined surface of the hub. The buffering component possesses a diameter that varies with respect to applied loading. One or both of the center post and the cage are adapted for restricting the diameter of the buffering component in one direction when the buffering component is storing a substantial amount of energy, and the cage is adapted for restricting the diameter of the buffering component in another direction when the buffering component is storing a substantial amount of energy.

In accordance with an additional aspect of the present invention, provided is an energy storing starter assembly comprising a pulley, a hub, and a torsion spring. The pulley is provided with a center post and a first inclined surface, and is adapted for receiving a pull rope. The hub is provided with a cage and a second inclined surface, and is adapted for releasably engaging an engine. The torsion spring provides a resilient connection between the pulley and the hub, and is designed to store and transmit energy between the pulley and the hub. The torsion spring is provided with a first portion, a second portion, a first tail, a second tail, and an inner and outer diameter that vary with respect to applied loading. The first and second portions of the torsion spring are adapted to interchangeably mate with the respective first and second inclined surfaces of the pulley and the hub, such that the first and second portions lie substantially flat against the respective inclined surfaces of the pulley and the hub. Further, the first and second tails of the torsion spring are adapted to be interchangeably received in respective holes of the pulley and the hub. One or both of the center post and the cage are adapted for restricting the inner diameter of the torsion spring when the torsion spring is storing a substantial amount of energy, and the cage is adapted for restricting the outer diameter of the torsion spring when the torsion spring is storing a substantial amount of energy.

In accordance with a further aspect of the present invention, provided is an engine assembly comprising an energy storing starter assembly and an engine. The energy storing starter assembly includes a pulley, a hub, and a buffering component. The buffering component provides a resilient connection between the pulley and the hub, and is designed to store and transmit energy between the pulley and the hub. The engine optionally includes a spark system adapted to provide a retarded spark during starting to enable a user to more easily start the engine using the energy storing starter assembly.

In accordance with another aspect of the present invention, provided is an energy storing starter assembly comprising a pulley, a hub, and a buffering component. The buffering component provides a resilient connection between the pulley and the hub, and is designed to store and transmit energy between the pulley and the hub. The hub can be comprised of a more durable material than the pulley.

In accordance with yet another aspect of the present invention, provided is an energy storing starter assembly comprising a pulley, a hub, and a plurality of buffering components. Each buffering component provides a resilient connection between the pulley and the hub, and is designed to store and transmit energy between the pulley and the hub.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Disclosed are various embodiments of an energy storing recoil starter device including a pulley with a rope, a hub, and a buffering device resiliently connecting the pulley to the hub for storing rotational energy. The device is for aiding a manually started engine, such as a two-stroke engine, for example, which is typically adapted to be disposed in a gas-powered tool, such as a chain saw, for example.

An example of the energy storing recoil starter device comprises a pulley, one or more buffering components, and a hub. The pulley is manually rotatable using, for example, a pull rope attached thereto. The buffering component provides a resilient connection between the pulley and the hub, and is capable of storing energy generated when the pulley is rotated. The buffering component transmits rotational energy from the pulley to the hub. The hub is releasably engageable with an engine flywheel and crankshaft, for transmitting rotational energy to an engine but capable of being released once the engine is started.

Figure 1A:
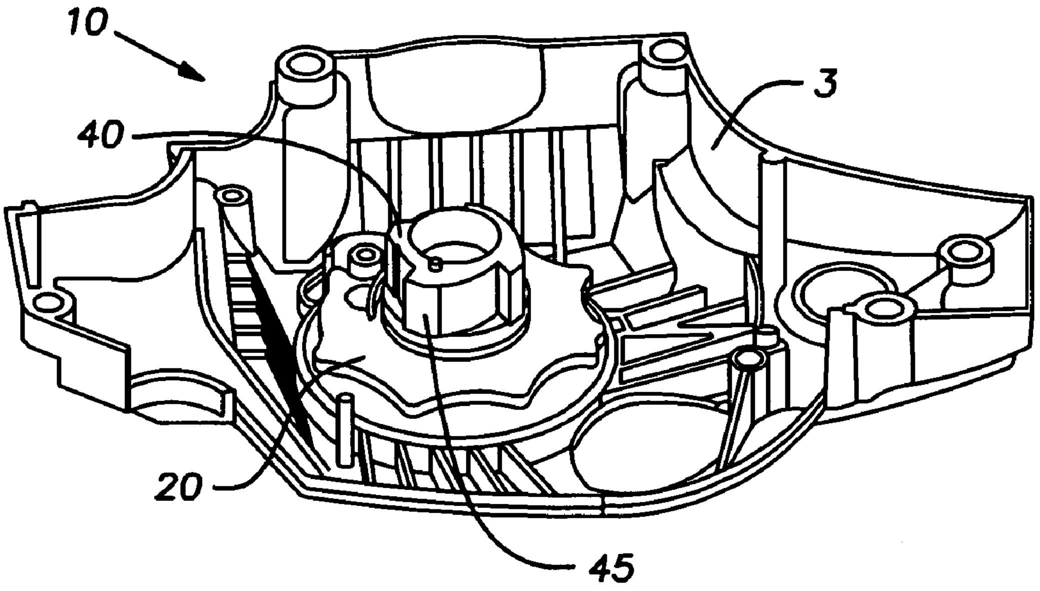
FIG. 1A is a perspective view of the energy storing starter device according to an embodiment of the invention.
Figure 1B:
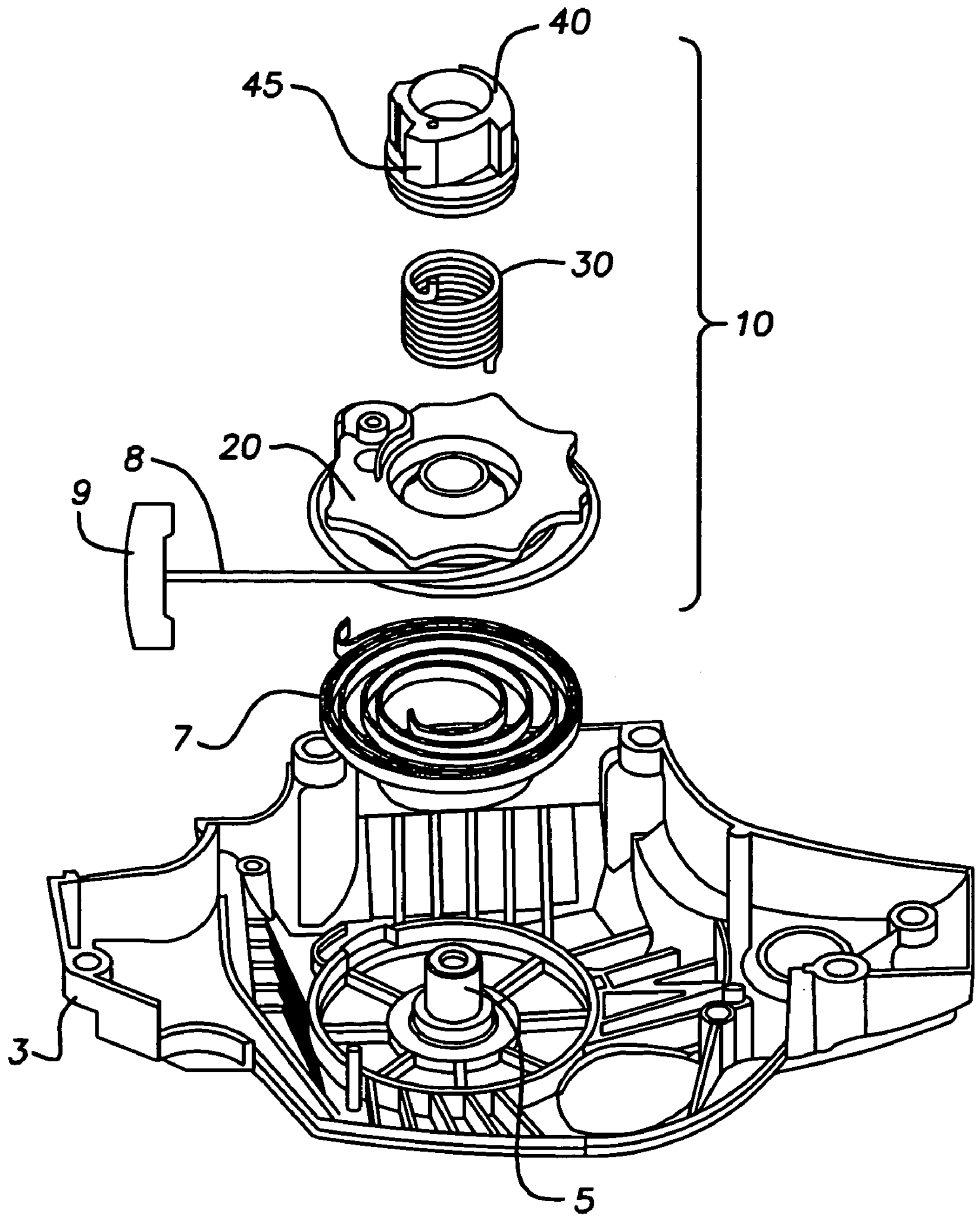
FIG. 1B is an exploded view of the starter device of FIG. 1A.

In an embodiment of the energy storing recoil starter device 10, shown in FIGS. 1A and 1B, the starter device is mounted within a fan housing 3. The starter device comprises a pulley 20, a torsion spring 30 acting as the buffering component, and a hub 40. The pulley 20 and the hub 40 thereby resiliently connected together via the spring 30, with the spring acting as an energy storage component to buffer the hub 40 from the pulley 20.

Further referring to FIG. 1B, a bearing lug 5 is provided on an internal surface of the fan housing 3, upon which the starter device 10 is mounted. A recoil spring 7, which may be a spiral spring, for example, is provided with one end connected to the fan housing 3 and an opposite end connected to the pulley 20. A recoil rope 8 is wound around the pulley 20, with one end of the rope 8 connected to a surface of the pulley 20. In the example embodiment, the rope is connected to the pulley using a screw fastener (not shown). A free end of the rope 8 is attached to a pull handle 9.

Figure 2:
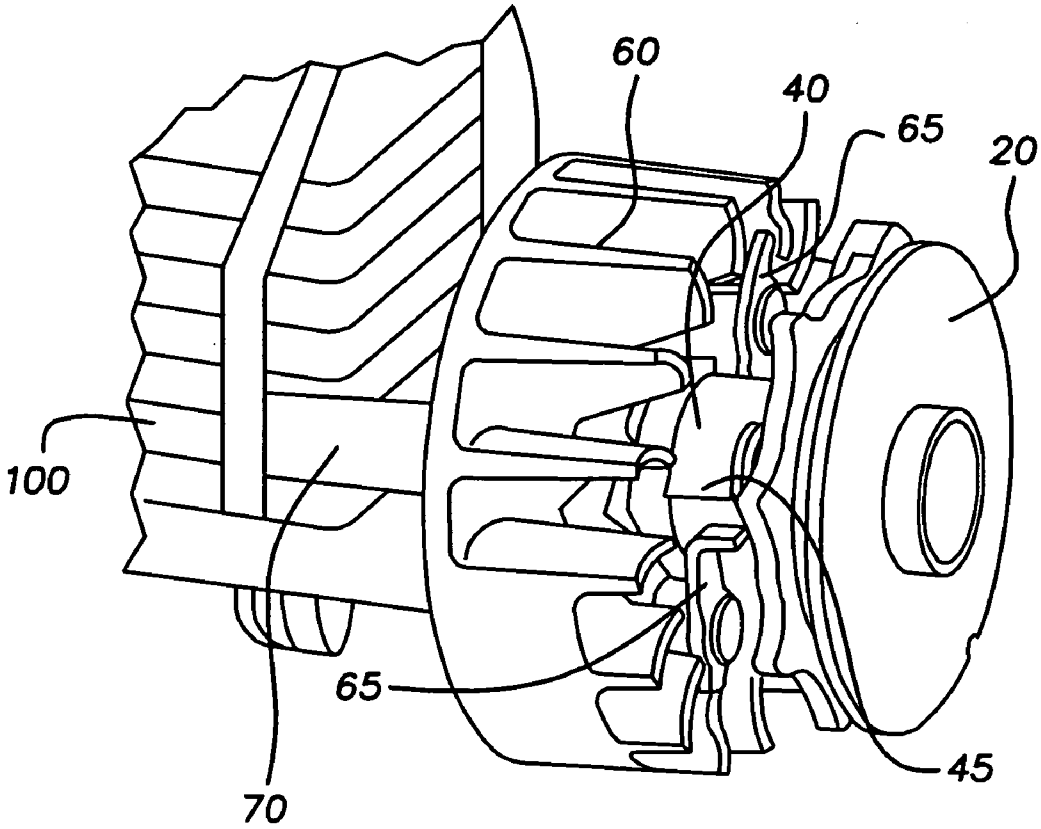
FIG. 2 is a perspective view of the starter device of FIG. 1A, as connected to a two-stroke engine.

The starter device 10 is further positioned to engage with an engine 100, as shown in FIG. 2. More specifically, the starter device 10 engages with a flywheel 60, via a clutch or ratchet mechanism as is known in the art. The clutch mechanism rotationally disconnects the starter device 10 from the flywheel 60 during engine operation but connects it during a starting operation. The clutch mechanism may be engaged at rest, or could be designed to mechanically engage only during the starting operation when the hub 40 is rotating. This clutch mechanism may comprise a set of ratchet teeth 45 on a surface of the hub (see FIGS. 1A and 1B), and hinged starter dogs 65, or similar latches, on the flywheel 60 (see FIG. 2). In operation, when the hub 40 is rotated in a forward direction, the ratchet teeth 45 engage with the starter dogs 65, transmitting the rotational force of the hub 40 to the flywheel 60 thus to a crankshaft 70.

The starter dogs 65 may be spring-loaded or otherwise arranged to operate as a centrifugal clutch, causing the starter dogs to disengage from the ratchet teeth 45 when the flywheel 60 has reached a predetermined rotational velocity, for example. Further, the ratchet teeth 45 may be formed so that the ratchet teeth 45 will only engage with the starter dogs 65 when rotating in a forward direction, thereby allowing disengagement of the hub 40 from the flywheel 60 when the hub 40 reduces its rotational velocity or is rotated in a backward direction.

Alternatively, the clutch mechanism may comprise moving latches on the hub and ratchet teeth on the flywheel, which would provide for a similar engagement between the hub and flywheel (not shown). Again, the engine may use spring-loaded latches or other centrifugal clutch mechanisms to provide for disengagement of the hub 40 from the flywheel 60 when a predetermined rotational velocity has been reached, for example.

Traditionally, the flywheel 60 is fixed to the crankshaft 70. As is known in the art, the crankshaft 70 is linked to a piston (not shown), which operates to compress a supplied fuel/air mixture provided to a cylinder when the crankshaft 70 is rotated. The operation of the engine after starting is known in the art and will not be detailed herein.

It is also contemplated that the starter device 10 may optionally be provided in an engine assembly further comprising a spark system having a sparking mechanism 105 capable of providing a retarded spark. In an engine using a traditional starting method without buffering, the piston is rotated directly proportional to the speed at which the rope is pulled by the user. However, by adding a buffering component, as the piston compresses the air-fuel mixture, the force opposing the compression increases, and the buffering component stores some of the energy being added to the system by the user (and perhaps also some energy feeding back from the engine). This tends to slow down the speed of the crankshaft, and might require faster pulling on the rope to start an engine using a normally timed spark.

Accordingly, by applying the buffering component in the starting mechanism, the resulting rotation of the crankshaft 70 driving the piston and compressing the air-fuel mixture in the engine 100 using a normally timed spark may fail to ignite the resulting supply of fuel at an optimum time. This could lead to difficulty in starting the engine, or may even prevent starting in some cases, because the crankshaft 70 is rotating more slowly due to the buffering action.

By retarding the spark (retarded relative to a similar engine not using a buffering component) using the sparking mechanism 105 during a starting operation, a spark may be supplied at a proper point in time such that the engine 100 is more easily started. Once the engine 100 has started, the sparking mechanism 105 or some other device will adjust the spark to provide a normally timed or advanced spark to accommodate the running engine. It is to be appreciated that each example timing setting may vary dependent upon particulars and parameters associated with the specific engine configuration, etc.

It is further contemplated that the hub 40, being a separate component from the pulley 20, may be provided in different materials. Because the hub 40 is exposed to repeated engagement and disengagement with the starter dogs 65, and thereby transmitting a rotational force to the crankshaft 70 through this contact, it may be desirable to construct the hub 40 from a more durable, wear-resistant material, while constructing the pulley 20 from a less durable, more cost efficient material, because the pulley sees lower mechanical stresses.

Figure 3A:
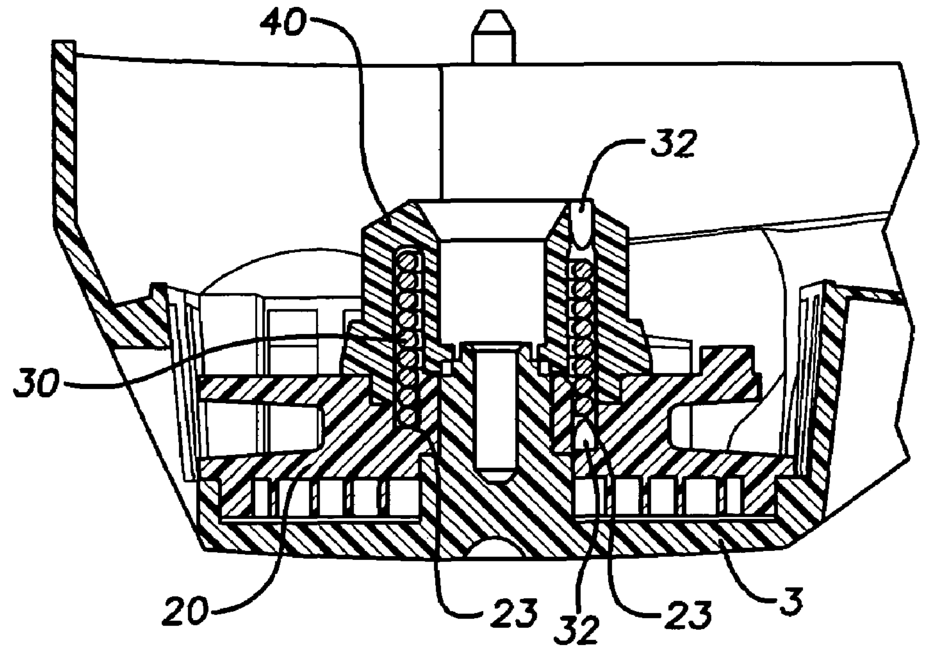
FIG. 3A is a section view of the starter device of FIG. 1A, wherein a buffering component comprises a torsion spring.

In the embodiment of FIGS. 1A, 1B, and 3A, discussed briefly above, the torsion spring 30 is utilized as the buffering component disposed between the pulley 20 and the hub 40. The torsion spring thus provides the resilient connection between the hub 40 and pulley 20. The torsion spring 30 is adapted to store and transmit energy when the pulley 20 is rotated during startup. In other embodiments of the invention, the starter device may use different buffering components for energy storage, such as a flat spiral spring 130 (shown in FIG. 3B), one or more extension springs 230 (shown in FIG. 3C), multiple spiral springs 330 (shown in FIG. 3D), or multiple torsion springs 430 (shown in FIG. 3E), as additional examples, to be described in more detail later.

Figure 4:
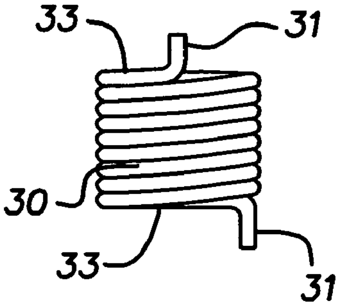
FIG. 4 is a perspective view of the torsion spring of the starter device of FIG. 3A.

Referring to the starter device 10 of FIG. 1B, in FIGS. 3A and 4, the torsion spring 30 is shown provided at each end with a connecting structure, such as a tail 32, one of which engages with a portion of the pulley 20 and the other of which engages with a portion of the hub 40. One tail 32 may be received in a corresponding hole or notch 22 within the pulley 20, shown in FIG. 5. Likewise, the other tail 32 may be received in a corresponding hole or notch 42 within the hub 40, as shown in FIG. 6.

The torsion spring 30 and the corresponding hub and pulley holes 42, 22 can be adapted such that the torsion spring 30 may be interchangeably installed between the hub 40 and pulley 20 in either direction. This design can be used to ease the manufacturing and assembly process, because the spring can then be installed in either direction, allowing a worker (or robot) to more easily position the spring during assembly.

As shown in FIG. 4, outermost end coils 33 of the torsion spring 30 are provided with a tapered incline, extending from the tail 32 at each end toward the inner coils of the wire torsion spring 30. To provide a secure fit and additional support for the torsion spring 30, the hub 40 and pulley 20 can be provided with inclined surfaces 43, 23 (shown in FIGS. 5 and 6, respectively) that substantially match the slope of the inclined surfaces of the end coils 33. The corresponding inclines thus allow the spring 30 to lie substantially flat against the mating inclined surfaces 43, 23 of the hub 40 and pulley 20. By making the inclines of the two surfaces 43, 23 and the spring end coils 33 all substantially match, the interchangeability of the torsion spring 30 can be maintained.

Figure 5:
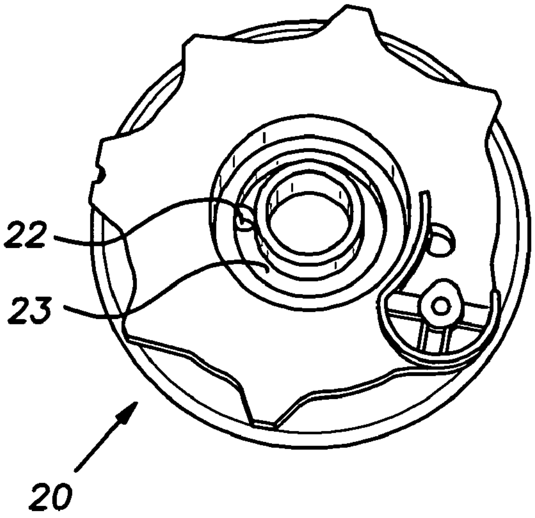
FIG. 5 is a perspective view of the pulley of the starter device of FIG. 3A.
Figure 6:
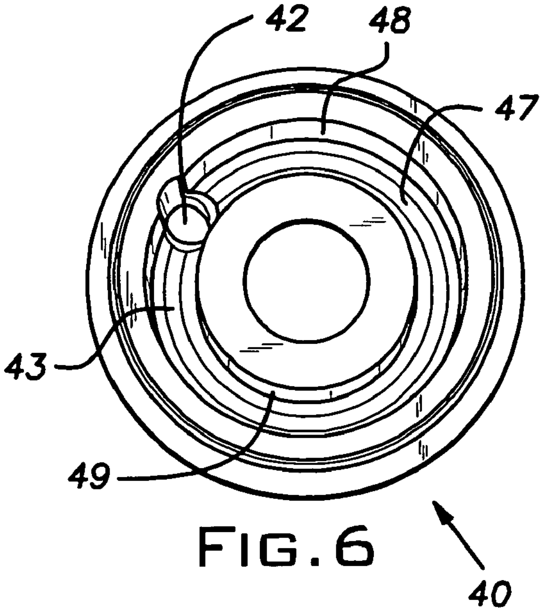
FIG. 6 is a perspective view of the hub of the starter device of FIG. 3A.

As further shown in FIGS. 3A and 5, the pulley 20 can be provided with a hollow cylindrical post 27, around which an end portion of the torsion spring 30 is disposed. Additionally, as shown in FIGS. 3A and 6, the hub 40 may be provided with an annular cage 47, which has a cylindrical outer wall 48 and a cylindrical inner wall (or post) 49, within which an opposite end portion of the spring 30 is disposed.

Typically, when the torsion spring 30 is twisted in a contracting direction, the diameter of the spring 30 is reduced, and when the torsion spring 30 is twisted in an expanding direction, the diameter of the spring 30 is increased. The cylindrical post 27 and the cylindrical inner wall 49 of the cage serve to limit the minimum diameter of the torsion spring 30 when the spring 30 is twisted in a contracting direction, while the cylindrical outer wall 48 serves to limit the maximum diameter of the spring when the spring 30 is twisted in an expanding direction.

These limitations to the spring diameter effectively limit the spring deflection during operation of the starter device 10 and help control the buffering action of the starter device as the spring 30 stores energy in one direction or the other, for example.

Figure 3B:
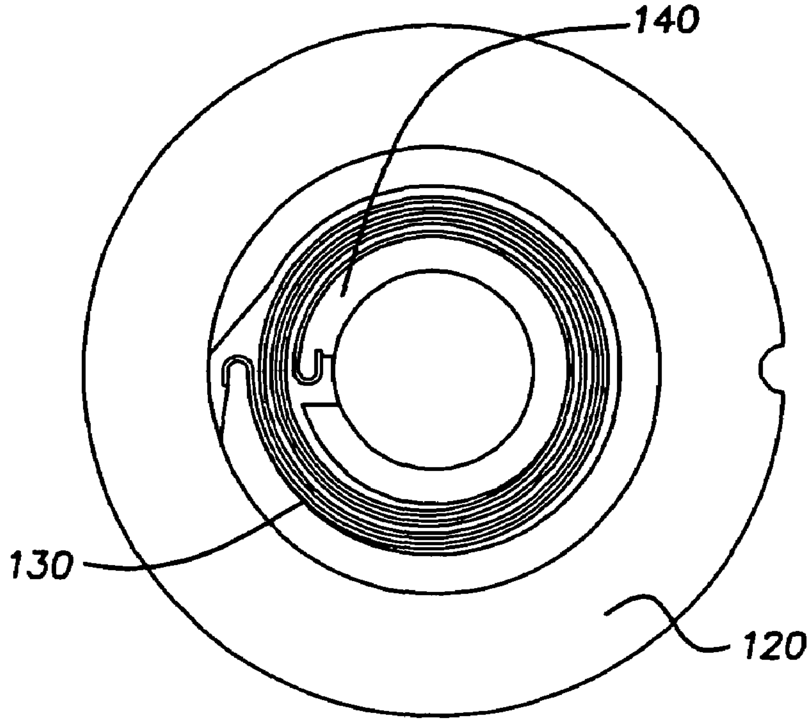
FIG. 3B is a plan view of a pulley and buffering component of another embodiment of the starter device according to the present invention, wherein the buffering component comprises a flat spiral spring.

In an alternative embodiment, as shown in FIG. 3B, for example, a spiral spring 130 acts as the buffering component having one end engaged with a hub 140 and an opposite end engaged with a pulley 120. When the pulley 120 is rotated during start-up, the spiral spring 130 is constricted, storing energy and providing the buffering action to assist in providing additional rotational force to the flywheel 60 and crankshaft 70 of FIG. 2 via the hub 140. The central portion of the spiral spring 130 is preferably positioned near a central rotational axis of the hub 140 and pulley 120.

Figure 3C:
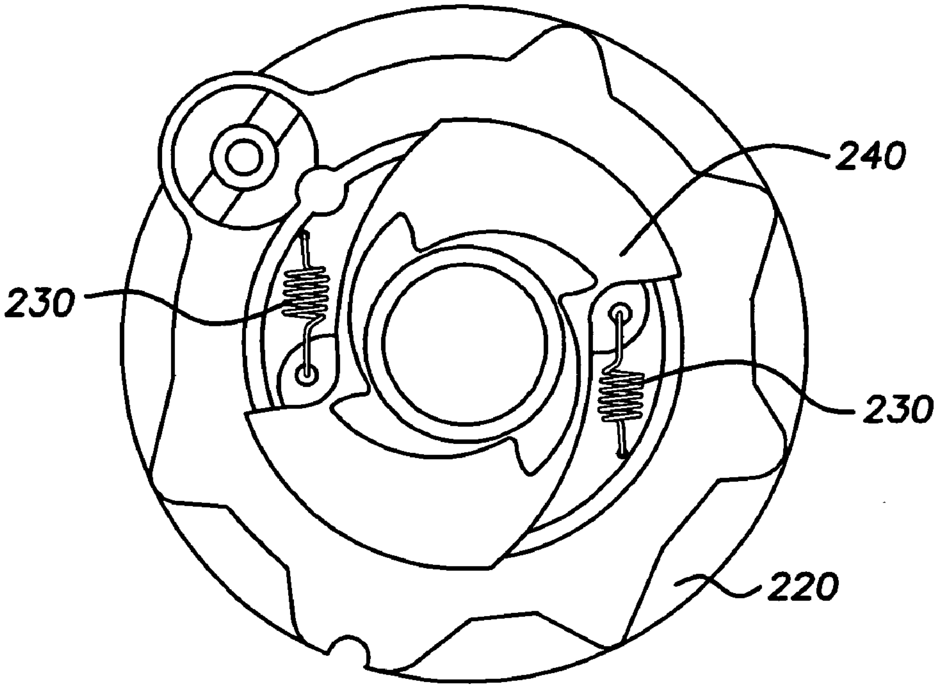
FIG. 3C is a plan view of an additional embodiment of the starter device according to the present invention, wherein the buffering component comprises extension springs.

In another alternative embodiment, as shown in FIG. 3C, for example, a plurality of extension springs 230 act as buffering components, each spring 230 having one end engaged with a hub 240 and an opposite end engaged with a pulley 220. When the pulley 220 is rotated during startup, the extension spring 230 extends, storing energy and providing the buffering action to assist in providing the needed rotational force to the flywheel 60 and crankshaft 70 via the hub 240. The ends of the extension spring may be attached to the hub 240 and pulley 220 at a distance from a central rotational axis of the hub 240 and pulley 220, so that a satisfactory rotational force may be provided by the extended spring 230 to rotate the hub 240.

Figure 3D:
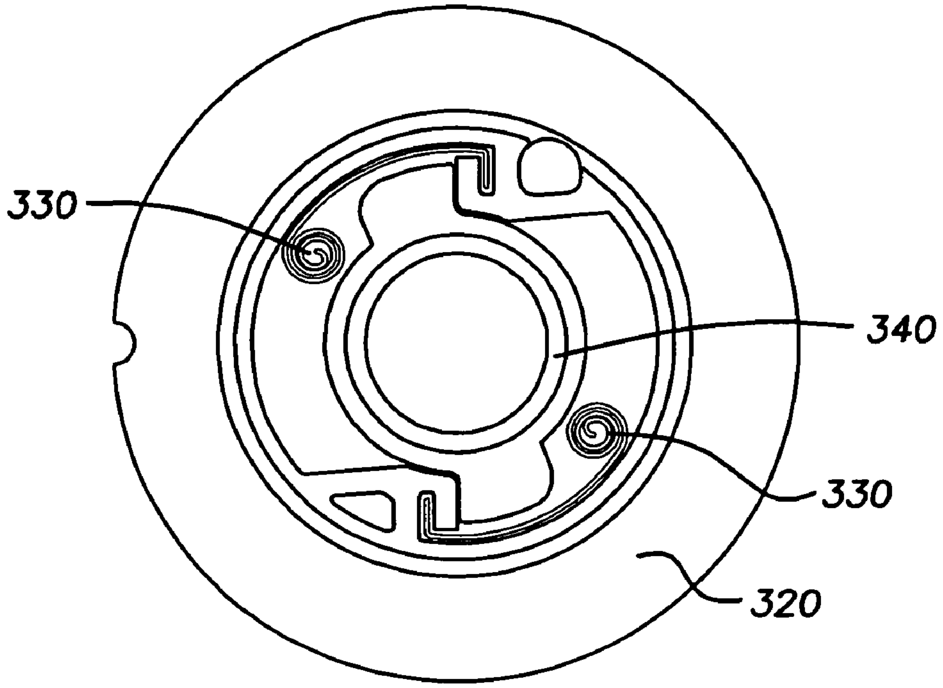
FIG. 3D is a plan view of a pulley and buffering component of a further embodiment of the starter device according to the present invention, wherein the buffering component comprises a pair of spiral springs.

In still another alternative embodiment, as shown in FIG. 3D, for example, a pair of spiral springs 330 act as buffering components, each spring 330 having one end engaged with a hub 340 and an opposite end engaged with a pulley 320. When the pulley 320 is rotated during startup, the spiral springs 330 are constricted, storing energy and providing the buffering action to assist in providing the needed rotational force to the flywheel 60 and crankshaft 70 via the hub 340. The ends of the spiral springs 330 may be attached to the hub 340 and pulley 320 at some distance from a central rotational axis of the hub 340 and pulley 320, so that a satisfactory rotational force (via a leverage action) may be provided by the spiral springs 330 to rotate the hub 340.

Figure 3E:
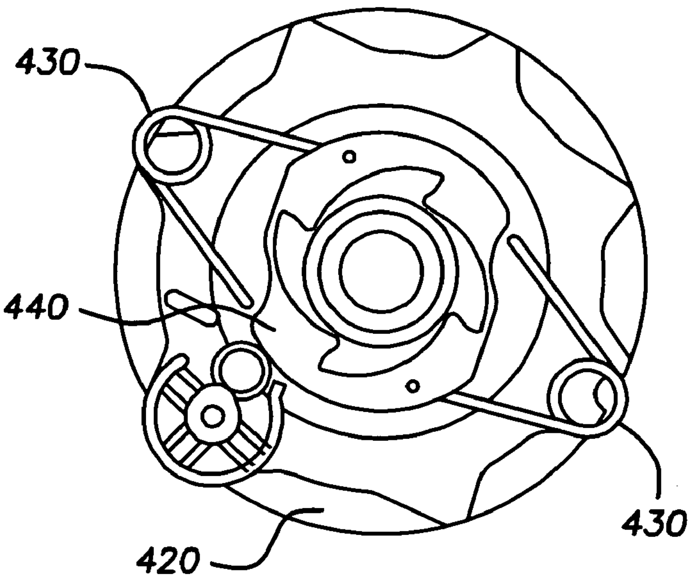
FIG. 3E is a plan view of another embodiment of the starter device according to the present invention, wherein the buffering component comprises a pair of torsion springs.

In yet another alternative embodiment, as shown in FIG. 3E, for example, a pair of torsion springs 430 act as the buffering components, each spring 430 having one end engaged with a hub 440 and an opposite end engaged with a pulley 420. When the pulley 420 is rotated during startup, the torsion springs 430 are twisted, storing energy and providing the buffering action to assist in providing the needed rotational force to the flywheel 60 and crankshaft 70 via the hub 440. The ends of the torsion springs 430 may be attached to the hub 440 and pulley 420 at a distance from a central rotational axis of the hub 440 and pulley 420, so that a satisfactory rotational force may be provided by the torsion springs 430 to rotate the hub 440.

In operating the example embodiment of the starter device 10 as shown in FIGS. 1A and 1B, the pull handle 9 and recoil rope 8 are pulled by a user, thereby unwinding the rope 8, causing the pulley 20 to rotate about the bearing lug 5 in a forward direction and activating the torsion spring 30. The forward rotation of the pulley 20 and some portion of the stored energy is transmitted to the hub 40 via the torsion spring 30.

As the hub 40 is rotated, the ratchet teeth 45 engage with a pair of hinged starter dogs 65 attached to an engine flywheel 60, thereby translating the rotational motion of the starter device 10 to the flywheel 60, which is fixed to the crankshaft 70 of the engine 100. During this operation, energy is stored in the spring, providing the buffering action. In a possible embodiment of the starter device 10, a retarding spark mechanism 105 provided within the engine assembly 100 causes the spark to be provided with a brief delay to facilitate ignition, easing the starting process.

As the crankshaft is further rotated, compressing the fuel-air mixture in the piston, an opposing force increases, further stressing the torsion spring and causing further energy to be stored. As the piston reaches and then passes top dead center (TDC), the stored energy in the torsion spring 30 is at least partially released, thus increasing the speed of the rotation, which can make further pulling easier for the next compression. The act of storing energy in the torsion spring 30 smoothes out the pulling process for the user, absorbing energy at moments of peak opposition due to compression forces in the cylinder.

It is to be appreciated that because the energy storage action tends to slow down the piston speed at the time of increasing compression (compared to the action with no buffering present), the retarding spark mechanism 105 is useful to ensure easy starting. As such, the spark is not provided as soon in the compression cycle.

Further, as the engine 100 is started and the piston compresses the fuel-air mixture in the cylinder, any kickback by this process can be absorbed by the buffering component 30, thus buffering this kickback from adversely impacting the person starting the engine 100 and storing the resulting energy. This energy absorbed by the buffering component 30 during kickback can then be used to further aid the starting process.

The alternative embodiments work in a manner similar to that described above, with the primary differences, if any, being in the manner in which energy is stored in the spring and transmitted from the corresponding pulley to the hub.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. An energy storing starter assembly comprising:

a pulley;

a hub; and a buffering component having a first end having a first tail and a second end having a second tail, said buffering component for resiliently connecting said pulley to said hub, wherein:

said buffering component is for storing and transmitting energy between said pulley and said hub, and said first and said second tails having outward extensions extending axially in opposite directions and adapted to be interchangeably received in a respective one of said pulley and said hub.

2. The starter assembly of claim 1, wherein said buffering component includes a torsion spring.

3. The starter assembly of claim 2, wherein said torsion spring includes a coil of wire, said first and second tails have outward extensions of said wire extending axially in opposite directions, and said outward extensions for being respectively received by holes in said one and the other of said pulley and said hub.

4. The starter assembly of claim 3, wherein said pulley includes a first support surface having an incline, said hub includes a second support surface having said incline, said buffering component includes a first portion and a second portion for mating with a respective one of said first support surface and said second support surface and being interchangeable for mating with the other said first support surface and said second support surface, and said first and second portions lie substantially flat against said respective first and said second support surfaces.

5. The starter assembly of claim 3, wherein said torsion spring has an inner diameter and an outer diameter that vary with respect to applied loading; said pulley has a center post;

said hub has a cage; one or both of said center post and said cage are adapted for restricting said inner diameter of said torsion spring when said buffering component is storing a substantial amount of energy, and said cage is adapted for restricting said outer diameter of said torsion spring when said buffering component is storing said substantial or another substantial amount of energy.

6. An engine assembly comprising an energy storing starter assembly according to claim 3 and an engine including a spark system, said engine being releasably engaged with said hub for receiving rotational energy, and said engine spark system being adapted for providing a retarded spark during starting to enable a user to more easily start said engine using said energy storing starter assembly.

7. The starter assembly of claim 1, wherein said buffering component has a diameter that varies with respect to applied loading; said pulley has a center post; said hub has a cage, one or both of said center post and said cage are adapted for restricting said diameter of said buffering component in at least one direction when said buffering component is storing a substantial amount of energy, and said cage is adapted for restricting said diameter of said buffering component in another direction when said buffering component is storing said substantial or another substantial amount of energy.

8. The starter assembly of claim 1, wherein said pulley includes a first support surface having an incline, said hub includes a second support surface having said incline, said buffering component has a first portion and a second portion for mating with a respective one of said first support surface and said second support surface and are interchangeable to mate with the other of said first support surface and said second support surface, and said first and said second portions lie substantially flat against said respective first and said second support surfaces.

9. The starter assembly of claim 8, wherein said buffering component has a diameter that varies with respect to applied loading; said pulley has a center post; said hub has a cage; one or both of said center post and said hub are adapted for restricting said diameter of said buffering component in at least one direction when said buffering component is storing a substantial amount of energy, and said cage is adapted for restricting said diameter of said buffering component in another direction when said buffering component is storing said substantial or another substantial amount of energy.

10. An engine assembly comprising an energy storing starter assembly according to claim 9, and an engine including a spark system, said engine being releasably engaged with said hub for receiving rotational energy, and said engine spark system being adapted for providing a retarded spark during starting to enable a user to more easily start said engine using said energy storing starter assembly.

11. An engine assembly comprising an energy storing starter assembly according to claim 8 and an engine including a spark system, said engine being releasably engaged with said hub for receiving rotational energy, and said engine spark system being adapted for providing a retarded spark during starting to enable a user to more easily start said engine using said energy storing starter assembly.

12. An engine assembly comprising an energy storing starter assembly according to claim 7 and an engine including a spark system, said engine being releasably engaged with said hub for receiving rotational energy, and said engine spark system being adapted for providing a retarded spark during starting to enable a user to more easily start said engine using said energy storing starter assembly.

13. An engine assembly comprising an energy storing starter assembly according to claim 1 and an engine including a spark system, said engine being releasably engaged with said hub for receiving rotational energy, and said engine spark system being adapted for providing a retarded spark during starting to enable a user to more easily start said engine using said energy storing starter assembly.

14. An energy storing starter assembly comprising:

a pulley having a first support surface having a first incline;

a hub having a second support surface having a second incline, wherein said first and second inclines have substantially similar geometry; and a buffering component having a first portion for mating with said first support surface and a second portion for mating with said second support surface, wherein said first and second portions have substantially similar geometry and are adapted to be interchangeably received by one of said first and second inclines in a respective one of said pulley and said hub, said buffering component for resiliently connecting said pulley to said hub, wherein said buffering component is for storing and transmitting energy between said pulley and said hub.

15. The starter assembly of claim 14, wherein said first and said second portions of said buffering component lie substantially flat against said first and said second support surfaces, respectively.

16. The starter assembly of claim 14, wherein said buffering component includes a torsion spring having of a coil of wire, and wherein said first portion is formed from said wire and said second portion is formed from said wire.

17. The starter assembly of claim 16, wherein said torsion spring has an inner and an outer diameter that vary with respect to applied loading, said pulley has a center post; said hub has a cage; one or both of said center post and said cage are adapted for restricting said inner diameter of said torsion spring when said buffering component is storing a substantial amount of energy, and said cage is adapted for restricting an outer diameter of said torsion spring when said buffering component is storing said substantial or another substantial amount of energy.

18. The starter assembly of claim 14, wherein said buffering component has a diameter that varies with respect to applied loading, said pulley has a center post; said hub has a cage; one or both of said center post and said cage are adapted for restricting said diameter of said buffering component in one direction when said buffering component is storing a substantial amount of energy, and said cage is adapted for restricting said diameter of said buffering component in another direction when said buffering component is storing said substantial or another substantial amount of energy.

19. An engine assembly comprising an energy storing starter assembly according to claim 18 and an engine including a spark system, said engine being releasably engaged with said hub for receiving rotational energy, and said engine spark system being adapted for providing a retarded spark during starting to enable a user to more easily start said engine using said energy storing starter assembly.

20. An engine assembly comprising an energy storing starter assembly according to claim 14 and an engine including a spark system, said engine being releasably engaged with said hub for receiving rotational energy, and said engine spark system being adapted for providing a retarded spark during starting to enable a user to more easily start said engine using said energy storing starter assembly.

21. The starter assembly of claim 14, wherein said buffering component includes a first end and a second end having outward extensions extending axially in opposite directions and adapted to be interchangeably received in a respective one of said pulley and said hub.

22. An energy storing starter assembly comprising:

a pulley having a center post and adapted for receiving a pull rope;

a hub having a cage and adapted for releasably engaging an engine; and a buffering component including a first end and a second end having outward extensions extending axially in opposite directions and adapted to be interchangeably received in a respective one of said pulley and said hub, said buffering component for resiliently connecting said pulley to said hub and for storing and transmitting energy between said pulley and said hub and having a diameter that varies with respect to applied loading, wherein one or both of said center post and said cage are adapted for restricting said diameter of said buffering component in one direction when said buffering component is storing a substantial amount of energy, and said cage is adapted for restricting said diameter of said buffering component in another direction when said buffering component is storing said substantial or another substantial amount of energy.

23. The starter assembly of claim 22, wherein said buffering component includes a torsion spring.

24. The starter assembly of claim 22, wherein said first end has a first tail to be received in a respective one of said pulley and said hub and a second tail to be received in the other of said pulley and said hub.

25. An engine assembly comprising an energy storing starter assembly according to claim 22 and an engine including a spark system, said engine being releasably engaged with said hub for receiving rotational energy, and said engine spark system being adapted for providing a retarded spark during starting to enable a user to more easily start said engine using said energy storing starter assembly.

26. The starter assembly of claim 22, wherein said pulley includes a first support surface having an incline, said hub includes a second support surface having said incline, said buffering component includes a first portion and a second portion for mating with a respective one of said first support surface and said second support surface and being interchangeable for mating with the other said first support surface and said second support surface, and said first and second portions lie substantially flat against said respective first and said second support surfaces.

27. An energy storing starter assembly comprising:

a pulley having a center post and a first surface at a first incline and adapted for receiving a pull rope;

a hub having a cage and a second surface at said first or a second incline and adapted for releasably engaging an engine; and a buffering component for storing and transmitting energy from said pulley to said hub, said buffering component including:

a first portion;

a second portion, and a diameter that varies with respect to applied loading, wherein said first portion and said second portion are adapted for mating with a respective one of said first surface and said second surface, and are interchangeable for mating with the other of said first surface and said second surface, such that said first portion and said second portion lie substantially flat against said respective first surface and said second surface;

wherein one or both of said center post and said cage are adapted for restricting said diameter of said buffering component in one direction when said buffering component is storing a substantial amount of energy, and wherein said cage is adapted for restricting said diameter of said buffering component in another direction when said buffering component is storing said substantial or another substantial amount of energy.

28. An engine assembly comprising an energy storing starter assembly and said engine both according to claim 27, wherein said engine includes a spark system, said engine being releasably engaged with said hub for receiving rotational energy from said hub, and said engine spark system is adapted for providing a retarded spark during starting to enable a user to more easily start said engine using said energy storing starter assembly.

29. An energy storing starter assembly comprising:

a pulley having a center post and a first surface at an incline and adapted for receiving a pull rope;

a hub having a cage and a second surface at said incline and adapted for releasably engaging an engine; and a torsion spring for resiliently connecting said pulley to said hub and for storing and transmitting energy between said pulley and said hub, said torsion spring including a first portion, a second portion, a first tail, a second tail, and an inner and an outer diameter that vary with respect to applied loading, wherein said first portion and said second portion are adapted for mating with a respective one of said first surface and said second surface, and are interchangeable for mating with the other of said first surface and said second surface, such that said first portion and said second portion lie substantially flat against said respective first surface and said second surface, said first and said second tails are each adapted to be received in a hole in a respective one of said pulley and said hub and are interchangeable to be received in a hole in the other of said pulley and said hub; one or both of said center post and said cage are adapted for restricting said inner diameter of said torsion spring when said torsion spring is storing a substantial amount of energy, and said cage is adapted for restricting said outer diameter of said torsion spring when said torsion spring is storing said substantial or another substantial amount of energy.

30. An engine assembly comprising an energy storing starter assembly and said engine both according to claim 29, said engine includes a spark system, said engine being releasably engaged with said hub for receiving rotational energy from said hub, and said engine spark system is adapted for providing a retarded spark during starting to enable a user to more easily start said engine using said energy storing starter assembly.

31. An engine assembly comprising:

an energy storing starter assembly including:

a pulley;

a hub; and a buffering component for resiliently connecting said pulley to said hub;

wherein said buffering component is for storing and transmitting energy from said pulley to said hub; and an engine including a spark system, said engine being releasably engaged with said hub for receiving rotational energy, wherein said engine spark system is adapted for providing a retarded spark during starting to enable a user to more easily start said engine using said energy storing starter assembly.

32. An energy storing starter assembly for transmitting a rotational force to a crankshaft of an engine, comprising:

a pulley;

a hub including a clutch mechanism configured to transmit a rotational force to a crankshaft of an engine; and a buffering component for resiliently connecting said pulley to said hub;

wherein said buffering component is for storing and transmitting energy from said pulley to said hub, and said clutch mechanism of said hub is comprised of a more durable material than said pulley.

33. The starter assembly of claim 32, wherein said clutch mechanism comprises ratchet teeth.

* * * * *